United States Patent [19]
Reik et al.

[11] Patent Number: 4,901,596
[45] Date of Patent: * Feb. 20, 1990

[54] ASSEMBLY FOR TAKING UP AND COMPENSATING FOR TORQUE-INDUCED SHOCKS

[75] Inventors: Wolfgang Reik, Bühl; Oswald Friedmann, Lichtenau, both of Fed. Rep. of Germany

[73] Assignee: Luk Lamellen Und Kupplungsbau GmbH, Bühl, Fed. Rep. of Germany

[*] Notice: The portion of the term of this patent subsequent to Feb. 9, 2005 has been disclaimed.

[21] Appl. No.: 113,226

[22] Filed: Oct. 23, 1987

Related U.S. Application Data

[60] Division of Ser. No. 896,136, Aug. 12, 1986, Pat. No. 4,723,463, which is a continuation of Ser. No. 669,770, Nov. 8, 1984, abandoned.

[30] Foreign Application Priority Data

Nov. 15, 1983 [DE] Fed. Rep. of Germany ....... 3341442
Mar. 5, 1984 [DE] Fed. Rep. of Germany ....... 3411239

[51] Int. Cl.$^4$ ............................................. F16F 15/10
[52] U.S. Cl. ...................................... 74/574; 196/106
[58] Field of Search ............... 192/106.2, 106.1, 70.17; 74/574, 572; 464/68

[56] References Cited

U.S. PATENT DOCUMENTS

| | | | |
|---|---|---|---|
| 3,931,876 | 1/1976 | Beeskow et al. | 192/106.2 |
| 4,212,380 | 7/1980 | Billet | 192/106.2 |
| 4,220,233 | 9/1980 | Ban et al. | 192/106.2 |
| 4,347,717 | 9/1982 | Lamarche | 192/106.2 |
| 4,378,869 | 4/1983 | Friedmann | 192/106.2 |

*Primary Examiner*—Henry A. Bennet
*Attorney, Agent, or Firm*—Peter K. Kontler

[57] ABSTRACT

A torsion damping assembly which is installed between the crankshaft of the engine and the input element of the change-speed transmission in a motor vehicle has two coaxial flywheels one of which is driven by the crankshaft and the other of which can transmit torque to the transmission in response to engagement of a friction clutch. The transmission of torque between the two flywheels takes place by way of a damper and a slip clutch which latter is effective only within a selected range of possible angular movements of the two flywheels relative to each other.

10 Claims, 4 Drawing Sheets

ASSEMBLY FOR TAKING UP AND COMPENSATING FOR TORQUE-INDUCED SHOCKS

CROSS-REFERENCE TO RELATED CASES

This is a division of the copending patent application Ser. No. 896,136 filed Aug. 12, 1986 now U.S. Pat. No. 4,723,463. The application Ser. No. 896,136 is a continuation of Ser. No. 669,770 filed Nov. 8, 1984 and now abandoned.

The assembly of the present invention is similar to the assembly which is disclosed in commonly owned copending patent application Ser. No. 661,028 filed Oct. 15, 1984 by Paul Maucher for "Assembly for taking up and compensating for torque-induced shocks", in commonly owned copending patent application Ser. No. 885,875 filed July 15, 1986 by Wolfgang Reik for "Assembly for compensating for fluctuations of torque which is transmitted by an internal combustion engine", in the commonly owned copending patent application Ser. No. 660,769 filed Nov. 8, 1984 by Wolfgang Reik for "Torsion damping assembly" and now abandoned, and in commonly owned copending patent application Ser. No. 669,658 filed Nov. 8, 1984 by Oswald Friedmann for "Assembly for damping torsion between the engine and the transmission of a motor vehicle".

BACKGROUND OF THE INVENTION

The invention relates to improvements in assemblies which can be utilized to take up and to compensate for shocks which develop as a result of fluctuations in the rotational speed of the output element of an internal combustion engine. More particularly, the invention relates to improvements in assemblies which can be used in motor vehicles between the internal combustion engine and the input element of a change-speed transmission to blunt the effects of shocks which develop as a result of fluctuations in the transfer of torque between the engine and the transmission. Still more particularly, the invention relates to improvements in assemblies of the type wherein a first rotary unit receives torque from the engine, a second rotary unit transmits torque to the transmission, the two units are coaxial with and rotatable within limits relative to each other, and the means for transmitting torque between the two units comprises a damper of vibrations and of other undesirable movements. As a rule, or at least in many instances, the damper comprises resilient elements which act in the circumferential direction of the two units and one or more friction generating devices.

Assemblies of the just outlined character are disclosed, for example, in German Offenleoungsschrift No. 29 26 012. The damping action between the two rotary units which can turn within limits with reference to one another is provided by energy storing devices in the form of coil springs and by a friction generating device which is installed to operate in parallel with the coil springs. The coil springs offer a progressively increasing resistance to further angular displacements of the two units with reference to each other from a starting or neutral position. In other words, the coil springs (or at least some of the coil springs) will yield in response to the exertion of a relatively small force when one of the units begins to move from the neutral position, and the resistance increases progressively as the angular displacement of the one unit relative to the other unit increases. The resistance which the friction generating device offers to rotation of the one unit relative to the other unit remains at least substantially constant.

Assemblies embodying the just described damper are designed to operate in such a way that their critical fundamental frequency, namely the critical RPM of the driven and driving parts, develops at a resonance which is below the ignition cycle frequency when the RPM of the engine is at a minimum value, namely the lowest RPM at which the engine is still running. However, when an internal combustion engine is started or turned off, it frequently takes a rather long period of time during which the RPM is within the critical range so that the vibration amplitude of the two units which are rotatable relative to each other increases still further as a result of excitation within such range of rotational speeds. The result is that the resilient elements of the damper between the two units undergo maximum deformation and enable rotation limiting stops on the two units to move into actual contact with each other. Under such circumstances, i.e., when the two stops actually abut against each other, the damper is totally ineffective in that it cannot compensate for or take up any shocks. Therefore, the vehicle which embodies such an assembly is vulnerable to shocks which develop while the two stops are in actual contact with one another due to the absence of any damping or shock absorbing action. This not only affects the comfort of the occupant or occupants of the motor vehicle but also generates pronounced noise. Still further, the shafts, bearings and certain other parts of the engine and transmission in the motor vehicle are likely to undergo substantial damage.

OBJECTS AND SUMMARY OF THE INVENTION

An object of the invention is to provide a novel and improved torsion damping assembly which is particularly effective during starting and/or stoppage of the engine in a motor vehicle.

Another object of the invention is to provide an assembly which can ensure adequate damping of undesirable movements and/or forces during each and every stage of the operation of a motor vehicle and is also highly effective during those stages when the aforediscussed and other conventional torsion damping assemblies are incapable of providing an adequate damping action.

A further object of the invention is to provide a simple, compact and inexpensive torsion damping assembly which can be incorporated in existing motor vehicles in lieu of presently known assemblies as a superior substitute therefor.

A further object of the invention is to provide a torsion damping assembly which can be used to compensate for shocks and variations of torque with a higher degree of efficiency, reliability and predictability than heretofore known assemblies.

An additional object of the invention is to provide a novel and improved method of damping vibrations and/or other undesirable movements between two coaxial parts of a flywheel in a motor vehicle.

A further object of the invention is to provide a novel and improved mode of establishing a torque transmitting connection between the internal combustion engine and the change-speed transmission of a motor vehicle.

Still another object of the invention is to provide novel and improved damper means for use in the above outlined assembly.

Another object of the invention is to provide novel and improved flywheels for use in the torsion damping assembly of the above outlined character.

The invention resides in the provision of an assembly which serves to take up and compensate for torque-induced shocks, especially to take up and compensate for torque which is transmitted between the internal combustion engine and the change-speed transmission of a motor vehicle The improved assembly comprises coaxial first and second units which are mounted for limited angular movements with reference to each other. The first unit normally receives torque from the engine and the second unit serves to normally transmit torque to the input element of the change-speed transmission The assembly further comprises a damper which is disposed between the two nits and operates to yieldably resist angular movements of the two units relative to each other, and at least one slip clutch which is interposed between the two units and includes opposing means for yieldably resisting a predetermined stage of angular movement of the two units with reference to each other The damper can comprise a plurality of coil springs or other suitable energy storing elements which act in the circumferential direction of the two units and/or one or more friction generating devices which are interposed between the two units and can be arranged to oppose each and every increment of angular movement of the two units with reference to one another. The damper and the slip clutch preferably operate in series (i.e., they become effective one after the other), and the slip clutch can constitute a multi-stage slip clutch To this end, the slip clutch can comprise a plurality of stages each of which serves to offer a different resistance to rotation of the two units relative to each other in different angular positions of such units relative to each other. The opposing means of the slip clutch can comprise resilient means in the form of diaphragm springs, leaf springs, coil springs and/or a combination of two or more different types of springs. The resilient means can include one or more springs which are effective to oppose rotation of the two units relative to each other in at least one end portion of the aforementioned stage of angular movement during which the slip clutch is effective.

The first and second units preferably comprise first and second flywheels, and the damper as well as the slip clutch are installed to yieldably resist rotation of the flywheels with reference to each other. In accordance with one presently preferred embodiment, the slip clutch comprises a first component which extends substantially radially inwardly from one of the flywheels and a second component which extends substantially radially from a portion of the other flywheel. One of the components has at least one tooth and the other component has a tooth space into which the tooth extends with a predetermined clearance, as considered in the circumferential direction of the two flywheels. The tooth preferably extends radially inwardly into the space between two radially outwardly extending teeth of the other component. The opposing means of such slip clutch preferably comprises friction generating means which is interposed between the two components to oppose angular movements of such components with reference to each other, as considered in the circumferential direction of the two units, as soon as the clearance between the tooth of the one component and a tooth of the other component is reduced to zero. The friction generating means can comprise at least one friction generating element which is non-rotatably affixed to one of the components and bears against the other component. The friction generating means preferably comprises two friction generating elements which are non-rotatably affixed to one of the components, which flank the other component, and which are urged against the other component. The opposing means can further comprise resilient means (e.g., one or more coil springs) which is or are provided in the tooth space at one or both sides of the tooth of the one component.

One component of the slip clutch can cooperate with or constitute the input component of the damper and the output component of such damper can comprise a pair of coaxial discs which are non-rotatably secured to each other and to one of the flywheels.

In accordance with another embodiment, the opposing means of the slip clutch can comprise at least one lamination provided on the first component of the slip clutch, at least one lamination provided on the second component of the slip clutch and means (e.g., a diaphragm spring) for biasing the laminations against each other. For example, the opposing means can comprise at least one first lamination on one of the components of the slip clutch, at least two second laminations provided on the other component of the slip clutch and flanking the first lamination, and a diaphragm spring which biases the second laminations against the respective sides of the first lamination. In order to obtain a multi-stage slip clutch, the second laminations can be mounted on the other component of the slip clutch with a different degree of play, as considered in the circumferential direction of the two units. Friction between one of the second laminations and the first lamination can be different from friction between the first lamination and the other second lamination; this can also influence the torque which the slip clutch can transmit between the flywheels of the two units.

In accordance with an additional embodiment of the invention, the slip clutch can comprise means for changing the resistance of the opposing means to angular movements of the two units relative to each other in response to changes in angular positions of the two components of the slip clutch relative to one another. The opposing means of such slip clutch can comprise two neighboring friction generating elements (or simply two neighboring rings or washers without any pronounced friction generating properties) and prestressed resilient means for biasing the two friction generating elements against each other. The means for changing the resistance of such opposing means can comprise means for varying the stress upon the resilient means in response to angular movement of the two units relative to each other. Such varying means can comprise cooperating cam and follower means provided on the two friction generating elements. One of these friction generating elements shares the angular movements of one of the components and the other friction generating element shares the movements of the other component of the slip clutch. The resilient means can comprise a diaphragm spring and the cam and follower means can be provided with ramps which are inclined with reference to a plane extending at right angles to the common axis of the two units.

As a rule, the two units are rotatable clockwise and counterclockwise relative to each other from a neutral position in which the two friction generating elements of the slip clutch also assume a neutral position. The arrangement is preferably such that the bias of the diaphragm spring is increased irrespective of whether one of the friction generating elements is rotated clockwise or counterclockwise with reference to the other friction generating element or vice versa.

The first unit can receive from the engine nominal torque of a predetermined magnitude, and the magnitude of torque which the slip clutch can transmit between the two flywheels is less (but can also be more) than the predetermined magnitude. For example, the slip clutch can transmit between 8 and 60 percent (preferably between 10 and 35 percent) of the predetermined torque. The magnitude of torque which is transmitted by the slip clutch can be between 5 and 50 percent (preferably between 7 and 30 percent) of the magnitude of torque which is transmitted by the damper. On the other hand, the magnitude of torque which the damper can transmit preferably exceeds the magnitude of nominal torque which the first unit receives from the engine.

The aforementioned stage of angular movement of the two units relative to each other can be between 10 and 50 degrees, preferably between 15 and 35 degrees.

The damper and the slip clutch jointly permit an angular movement of the two units relative to each other through a predetermined angle, and the two components of the slip clutch are preferably movable relative to each other through an angle which is between 60 and 110 percent (most preferably between 80 and 90 percent) of the predetermined angle. The two components of the slip clutch are preferably turnable relative to each other through angles exceeding the maximum angle of clockwise or counterclockwise rotation of one of the flywheels with reference to the other flywheel Also, the extent of angular displacement of one flywheel with reference to the other flywheel in a clockwise direction can exceed the extent of angular displacement of such one flywheel in a counterclockwise direction, or vice versa.

In the presently preferred torsion damping assembly, the slip clutch is designed to start opposing rotation of the two units relative to each other (either in a clockwise or in a counterclockwise direction) after the one or the other unit leaves its neutral or starting position. During such initial stage or stages of rotation of the two units relative to each other, their mutual angular movements are yieldably resisted by the damper, i.e., by the aforementioned resilient elements of the damper and/or by the friction generating device or devices of the damper.

The slip clutch can constitute a so-called load-responsive clutch whose opposing means begins to frictionally resist (yieldably oppose) further rotation of the two units relative to each other after the two units complete an angular movement from neutral position through a preselected angle which may but need not be the same for rotation in a clockwise and in a counterclockwise direction Alternatively or in addition to frictional resistance, the slip clutch which constitutes a load-responsive clutch can include means for storing energy after the two units complete a predetermined angular movement in a clockwise or in a counterclockwise direction with reference to one another.

The novel features which are considered as characteristic of the invention are set forth in particular in the appended claims. The improved torsion damping assembly itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
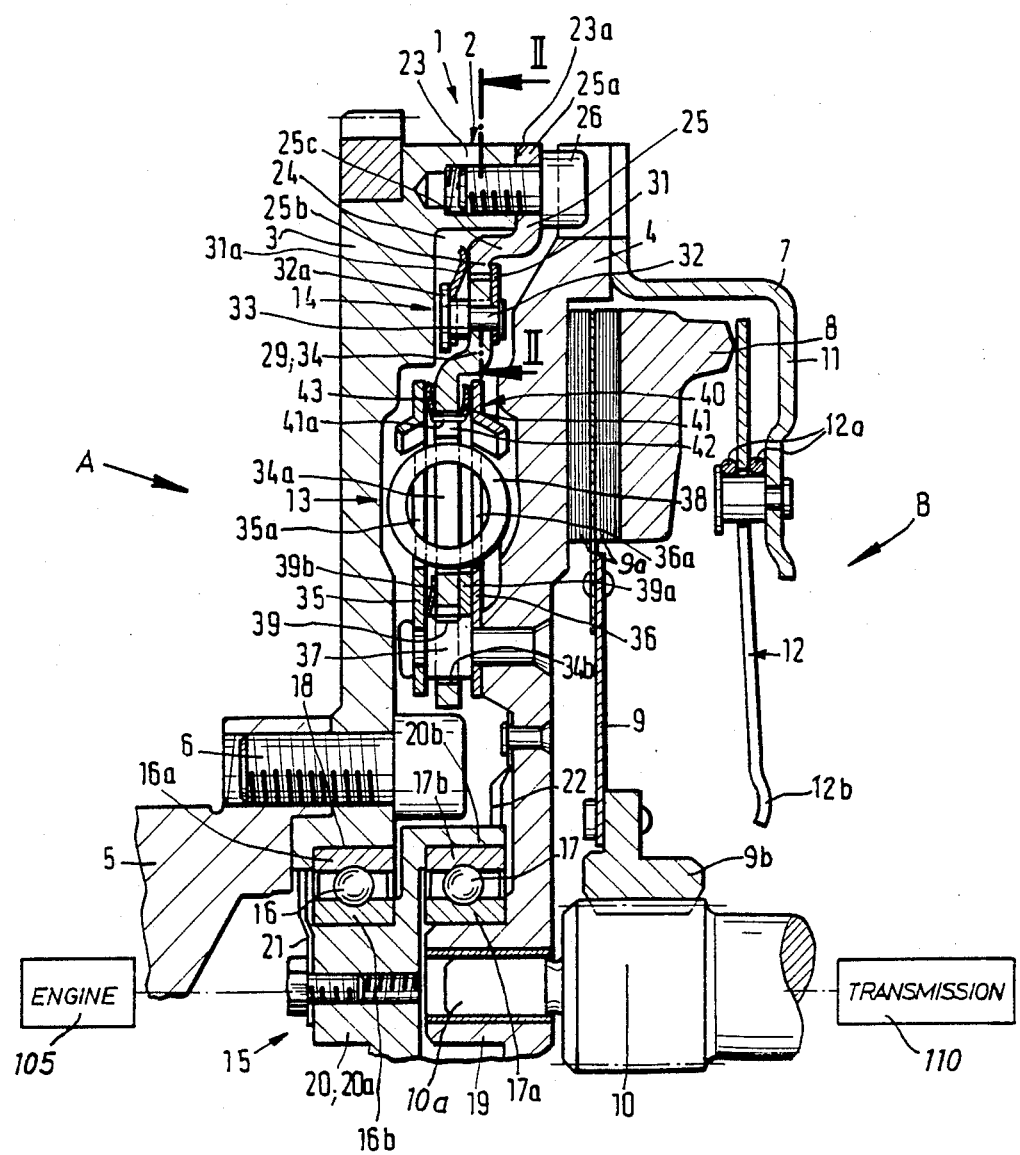
FIG. 1 is a fragmentary axial sectional view of a torsion damping assembly with a slip clutch which embodies one form of the invention.
Figure 2:
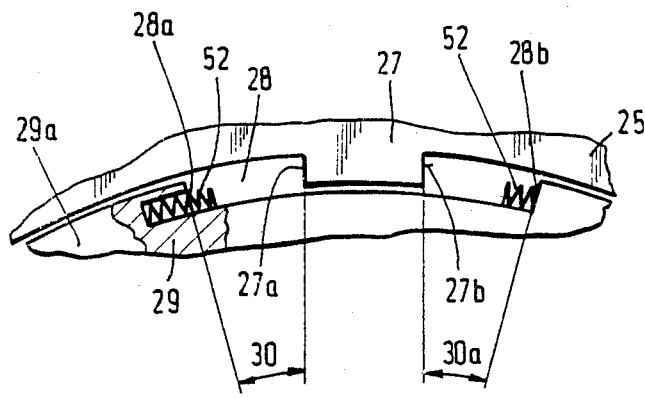
FIG. 2 is a fragmentary sectional view as seen in the direction of arrows from the line II—II of FIG. 1.

Referring first to FIGS. 1 and 2, there is shown a torsion damping assembly 1 which operates between an internal combustion engine 105 and a change-speed transmission 110 in a motor vehicle. The assembly 1 comprises two coaxial units A and B the first of which includes a crankshaft 5 which is driven by the engine 105 and a first flywheel 3, and the second of which comprises a second flywheel 4 and a friction clutch 7. The crankshaft 3 is separably affixed to the flywheel 5 by an annulus of bolts 6 or other suitable fasteners, and the housing or cover 11 of the friction clutch 7 is affixed to the flywheel 4. When the clutch 7 is engaged, its clutch disc or plate 9 transmits torque to the input element 10 of the transmission 110. The clutch 7 further comprises a pressure plate 8 which normally bears against one of two friction linings 9a on the clutch disc 9 and urges the other lining 9a into torque-receiving engagement with the flywheel 4. A diaphragm spring 12 of the friction clutch 7 is tiltable between two seats 12a of the cover 11 and normally bears against the peripheral portion of the clutch plate 8 so that the internally splined hub 9b of the clutch disc 9 rotates the externally splined portion of the input element 10. In order to disengage the clutch 7, i.e., to terminate the transmission of torque between the engine 105 and the transmission 110, the radially inwardly extending prongs 12b of the diaphragm spring 12 must be moved in a direction to the left, as viewed in FIG. 1, in order to move the radially outermost portion of the diaphragm spring 12 in a direction away from the flywheel 4 The latter and the flywheel 3 together constitute a composite body or flywheel 2 of the improved torsion damping device 1 and this device further comprises a damper 13 which is installed between and yieldably opposes rotation of the flywheels 3 and 4 relative to each other. In accordance with a feature of the invention, the means for opposing rotation of the flywheels 3 and 4 (i.e., of the units A and B) relative, to each other further comprises a second damper in the form of a slip clutch 14 which is disposed radially outwardly of the damper 13. The damper 13 and the slip clutch 14 operate in series.

A system 15 of bearings is interposed between the flywheels 3 and 4. In the embodiment of FIGS. 1 and 2, the system 15 comprises two antifriction ball bearings 16 and 17 which are disposed side by side, as considered in the axial direction of the flywheels 3 and 4, and which are but need not be identical. The outer race 16a of the bearing 16 is installed in a centrally located recess 18 of the flywheel 3 and is compelled to share the angular movements of the latter The inner race 17a of the bearing 17 surrounds and is non-rotatably mounted on a centrally located protuberance 19 of the flywheel 4. This protuberance centers the smaller-diameter extension 10a of the input element 10 and contains a friction bearing for the extension 10a. The inner race 16b of the bearing 16 is non-rotatably connected to the outer race 17b of the bearing 17 by a coupling element 20 which has a cylindrical portion 20a surrounded by and non-rotatably secured to the inner race 16b and an annular or bell-shaped portion 20b which surrounds and is non-rotatably secured to the outer race 17b The two portions 20a, 20b of the coupling element 20 are disposed side by side, as considered in the axial direction of the flywheels 3 and 4, and are integrally connected to each other by a washer-like radially extending portion of the coupling element 20.

In order to ensure that the races 16b, 17b will rotate with reference to the associated races 16a, 17a even if the flywheels 3 and 4 perform small or minute oscillatory (back and forth) angular movements relative to each other, the assembly 1 of FIGS. 1 and 2 further comprises two motion transmitting devices 21 and 22 the first of which acts between the cylindrical portion 20a and the flywheel 3 and the second of which acts between the flywheel 4 and the annular portion 20b of the clutch element 20. The illustrated motion transmitting devices 21 and 22 act not unlike freewheels and compel the clutch element 20, and hence the races 16b and 17b, to rotate in a single direction with reference to the flywheels 3 and 4. The direction in which the motion transmitting device 21 blocks rotation of the coupling element 20 relative to the flywheel 3 is the same in which the motion transmitting device 22 blocks rotation of the coupling element 20 with reference to the flywheel 4. The motion transmitting devices 21 and 22 ensure uniform wear upon the tracks of the races 16a, 16b, 17a, 17b as well as upon the spherical rolling elements of the bearings 16 and 17 by preventing the rolling elements from simply oscillating back and forth when the nature of operation of the vehicle is such that the flywheels 3 and 4 turn back and forth relative to each other at a high frequency but at a low or very low amplitude (e.g., less than one degree).

The peripheral portion 23 of the flywheel 3 constitutes a circumferentially complete rim which surrounds a chamber 24 for the majority of parts of or the entire composite damper including the damper 13 and slip clutch 14. That end face (23a) of the rim 23 of the flywheel 3 which faces toward the flywheel 4 is adjacent to the input component 25 of the slip clutch 14, and such input component is affixed to the flywheel 3 by a set of bolts, screws or other suitable fastener means 26. The input component 25 comprises radially extending sections 25a and 25b which are staggered relative to each other, as considered in the axial direction of the flywheels 3, 4, and are connected to each other by an axially extending section 25c located in the chamber 24.

The radially innermost section 25b of the input component 25 has one or more radially inwardly extending teeth 27 (see particularly FIG. 2) each of which is disposed in a tooth space 28 of the output component 29 of the slip clutch 14. The tooth space 28 which is shown in FIG. 2 is machined into or is otherwise formed in the periphery (radially outermost portion) of the output component 29. The tooth 27 is received in the tooth space 28 with a certain amount of play (30+30a) which determines the extent to which the components 25 and 29 of the slip clutch 14 are rotatable relative to each other in the directions which are indicated by the arrows 44 and 45. In FIG. 2, the component 25 is located in an intermediate position because the play 30+30a has two portions disposed at the opposite sides of the tooth 27. The flanks of the tooth 27 are denoted by the reference characters 27a and 27b; such flanks face helical springs 52 which are recessed into the tooth flanks 28a, 28b of the component 29 and extend in part into the adjacent portions of the tooth space 28 at the respective sides of the tooth 27. The springs 52 are partially recessed into the flanks 28a, 28b of teeth 29a and 29b which form part of the component 29 and flank the tooth space 28

The means for establishing a yieldable connection between the components 25 and 29 of the slip clutch 14 comprises two friction generating elements 31 and 31a which flank the components 25, 29 and are rigidly (non-rotatably) connected to the component 29. The connecting means comprises specially designed rivets 32 which are affixed to the radially outermost portion of the component 29 of the slip clutch 14 The friction generating element 31a is movable axially of the flywheels 3, 4 toward and away from the element 31 by sliding along the larger-diameter portions 33 of the rivets 32. The element 31a stores energy and is or acts not unlike a diaphragm spring which reacts against the heads 32a of the rivets 32 and bears against the radially extending section 25b of the component 25. The element 31 is in frictional engagement with the corresponding sides of both components (25, 29) of the slip clutch 14. It will be noted that the rivets 32 constitute retainers for the element or diaphragm spring 31a as well as a means for holding the elements 31 and 31a against rotation with reference to the components 25, 29. The element 31 is held in requisite frictional engagement with the adjacent sides of the components 25, 29 under the action of the prestressed diaphragm spring 31a.

In the embodiment of FIGS. 1 and 2, the components 25, 29 and the elements 31, 31a are made of steel so that the frictional engagement is a metal-to-metal type engagement. However, it is equally possible to resort to organic or inorganic washers or like inserts (for example, between the metallic element 31 and the adjacent side of the section 25b of the component 25) in order to generate a different type of friction.

In accordance with a feature of the invention, the slip clutch 14 is integrated into the damper 13. Thus, the radially innermost portion 34 of the component 29 of the clutch 14 constitutes the input component of the damper 13 and is flanked by two spaced-apart discs 35, 36 forming part of the unit B. The discs 35, 36 are rigidly connected to each other and to the flywheel 4 by a set of distancing elements 37 in the form of rivets whose central portions are received with play (as considered in the circumferential direction of the flywheels 3 and 4) in arcuate slot-shaped openings 34b of the portion 34. The latter has windows 34a which are flanked by windows 35a and 36a of the respective discs 35 and 36. Each of the windows 34a receives a portion of a coil spring 38 which constitutes one energy storing element of the damper 13 and further extends into the respective windows 35a and 36a. The coil springs 38 oppose rotation of the flywheels 3 and 4 relative to each other.

The damper, 13 further comprises a friction generating coupling device 39 which yieldably opposes rotation of the flywheels 3 and 4 during each stage of their angular movement relative to one another, i.e., during each and every stage of rotation of the discs 35, 36 relative to the innermost portion 34 of the output component 29 and/or vice versa. Still further, the damper 13 comprises an additional friction generating coupling device 40 which becomes effective only during a certain stage of angular movement of the flywheel 4 relative to the flywheel 3 in a clockwise or counterclockwise direction, or vice versa.

The friction generating device 39 comprises a ring-shaped friction generating element 39a which is interposed between the portion 34 and the disc 36. Furthermore, the friction generating device 39 comprises a diaphragm spring 39b which reacts against the disc 35 and bears against the portion 34 so as to urge the latter into requisite frictional engagement with the element 39a as well as to urge the element 39a into frictional engagement with the disc 36.

The load-responsive friction generating device 40 comprises a friction ring 41 having axially extending arms 41a. The arms 41a extend axially from the radially innermost portion of the ring 41 and through apertures or slots 42 of the portion 34. The apertures 42 merge into the aforementioned windows 34a of the portion 34 for the coil springs 38. The length of the apertures 42, as considered in the circumferential direction of the flywheels 3 and 4, is selected in such a way that the parts 41 and 34 can rotate relative to each other only during certain stages of angular movement of the flywheels 3 and 4 with reference to each other. The device 40 further comprises a diaphragm spring 43 whose radially outermost portion reacts against the radially outermost portion of the disc 35 and whose radially innermost portion bears against the tips of the arms 41a so that the radially outermost portion of the ring 41 is maintained in frictional engagement with the adjacent side of the disc 36. The discs 35 and 36 constitute the output component of the damper 13 and determine the extent to which the portion 34 (i.e., the input component of the damper 13) can turn with reference to the flywheel 4. As mentioned above, the discs 35 and 36 form part of the unit B because they are rigidly affixed to the flywheel 4. On the other hand, the portion 34 is rigidly affixed to the flywheel 3 by the fastener means 26. The flywheels 3, 4 cannot turn relative to each other when the central portions of the rivets 37 come into abutment with the surfaces at the one or the other end of the respective arcuate slots 34b in the portion 34.

Figure 3:
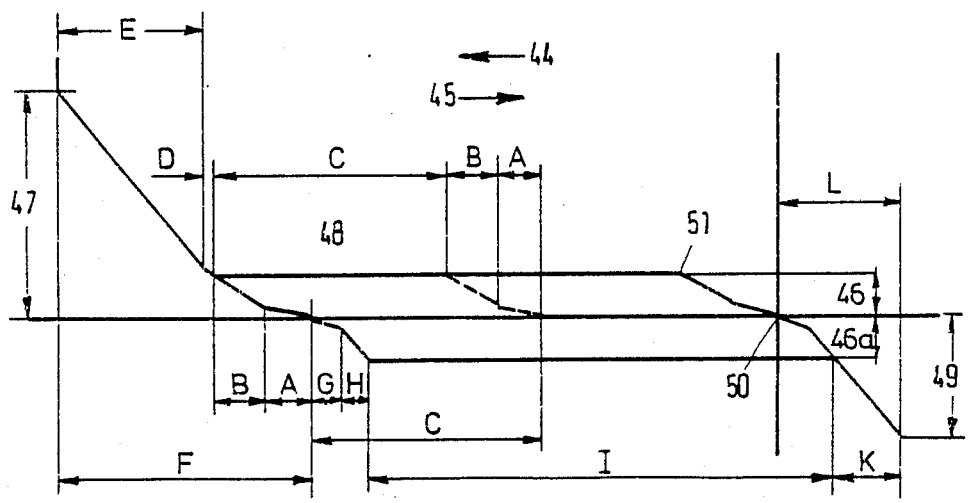
FIG. 3 is a diagram showing the characteristic damping curve of the assembly which is shown in FIGS. 1 and 2.

The dimensions of the windows 35a, 36a in the discs 35, 36, the dimensions of the windows 34a in the portion 34 of the output component 29, and the dimensions and characteristics of the coil springs 38 are selected in such a way that the characteristic damping curve of the assembly 1 is a stepped curve, e.g., of the type shown in the diagram of FIG. 3. In this diagram, the extent of angular displacement of the flywheels 3, 4 relative to each other is measured along the abscissa and the magnitude of torque which is being transmitted between the two flywheels is measured along the ordinate. The arrow 44 indicates the direction in which the flywheel 3 rotates in order to drive the wheels of the motor vehicle through the medium of the change-speed transmission 110, and the arrow 45 indicates the direction of rotation when the vehicle is coasting, i.e., when the output element 10 tends to transmit torque to the crankshaft 5.

It is assumed that the damper 13 is idle (its parts then assume the positions which are shown in FIG. 1) and that the tooth 27 of the input element 25 of the slip clutch 14 is located in the central or neutral position of FIG. 2. In such position, the tooth 27 may but need not be located exactly midway between the flanks 28a, 28b of the neighboring teeth 29a and 29b on the output component 29 of the slip clutch 14. If the flywheel 3 or 4 thereupon begins to turn relative to the flywheel 4 or 3 in the direction or arrow 44, such angular movement is opposed at first by one or more coil springs 38 which constitute the first or weakest constituents of the resilient means including all of the coil springs 38 of the damper 13. When the flywheel 3 or 4 (let it be assumed here that the flywheel 3 rotates relative to the flywheel 4) completes an angular movement through the angle A' (FIG. 3) and continues to turn in the direction of arrow 44, the weakest coil spring or springs 38 of the damper 13 are assisted by the next set of (stronger) coils springs 38 so that the damper 13 then offers a more pronounced resistance to rotation of the flywheel 3 relative to the flywheel 4. When the flywheel 3 completes an angular movement through the angles A' and B', the coil springs 38 of the first two sets of such springs in the damper 13 jointly transmit a torque which matches the torque 46 that can be transmitted by the slip clutch 14. Thus, if the flywheel 3 continues to turn with reference to the flywheel 4 in the direction of arrow 44 beyond the angle A'+B', the components 25, 29 of the slip clutch 14 move relative to each other until the flank 27b of the tooth 27 shown in FIG. 2 engages with the flank 28b of the tooth 29b on the component 29. This terminates the ability of the input and output components 25, 29 of the slip clutch 14 to move relative to each other. As the flywheel 3 continues to turn in the direction of arrow 44 through the angle C of FIG. 3, the components 25 and 29 rotate as a unit because the tooth 27 of FIG. 2 continue to bear against the tooth 29b. When the angular movement of the flywheel 3 through the angle A'+B'+C is completed, the coil springs 38 of the first two sets undergo additional compression while the flywheel 3 turns through the angle D. The coil spring or springs 38 of the third set of such coil springs in the damper 13 store energy while the flywheel 3 turns through the angle E, i.e., rotation of the flywheel 3 relative to the flywheel 4 in the direction of arrow 44 is then opposed by three sets of coil springs 38. Deformation of (i.e., storing of energy by) the third set of coil springs 38 is terminated when the flywheel 3 completes the angle A'+B'+C+D+E; at such time, the median portions of the distancing elements 37 come into engagement with the arcuate (concave) end portions of surfaces bounding the respective arcuate slots 34b in the portion 34 of the output component 29 of the slip clutch 14. From there on, the flywheels 3 and 4 rotate as a unit if the flywheel 3 continues to turn in the direction of arrow 44. The torque which the damper 13 then transmits between the flywheels 3 and 4 is shown in FIG. 3 at 47. Such torque preferably somewhat exceeds the nominal torque which is transmitted by the internal combustion engine 105 so that the distancing elements 37 are likely to strike against the aforementioned arcuate end portions of surfaces bounding the respective slots 34b of the portion 34 (input component of the damper 13) only when the direction of load changes and the magnitude of transmitted torque exceeds the anticipated magnitude.

During return movement of the parts of the damper 13 to their normal or starting positions of FIG. 1 (such starting positions have been shifted in the direction of arrow 44 through the angle C due to angular movement of the components 25, 29 of the slip clutch 14 relative t each other and are indicated in FIG. 3 by the reference character 48), the coil springs 38 of the damper 13 dissipate energy during an angular movement of the flywheel 3 relative to the flywheel 4 in the direction of arrow 45 through an angle F. The angle F equals the sum of angles A', B', D and E. The angle B'+D is the angle which is covered by the flywheel 3 while the coil spring or coil springs 38 of the second set of such springs in the damper 13 dissipate energy. If the flywheel 3 continues to turn relative to the flywheel 4 in the direction of arrow 45 beyond the new neutral or starting position 48, the coil spring or coil springs 38 of the first set begin to store energy while the flywheel 3 turns through an angle G. When the angular movement through the angle G (in the direction of arrow 45) is completed, the parts 34 and 35, 36 cooperate to stress the coil spring or coil springs 38 of the second set so that the angular movement of the flywheel 3 in the direction of arrow 45 is then opposed by two sets of coil springs 38. Such springs continue to store energy until the torque which is generated thereby reaches that value at which the coil springs of the first and second sets overcome the force (46a) with which the components 25 and 29 of the slip clutch 14 oppose rotation relative to each other. At such time, the components 25 and 29 of the clutch 14 start to turn with reference to one another and this angular movement of the parts 25, 29 relative to one another is terminated when the flanks 27a of the teeth 27 on the input component 25 engage the flanks 28a of the respective teeth 29a on the output component 29 of the slip clutch 14. Such angular movement of the components 25, 29 of the slip clutch 14 relative to each other is completed while the flywheel 3 turns in the direction of arrow 45 through an angle I. The reference character H denotes in FIG. 3 that angle which is covered by the flywheel 3 in the direction of arrow 45 while the coil spring or coil springs 38 of the second set of such springs in the damper 13 undergo additional compression before the components 25, 29 of the slip clutch 14 begin to slide relative to each other.

When the flanks 27a of the teeth 27 engage the flanks 28a of the respective teeth 29a on the output component 29 of the slip clutch 14, and if the flywheel 3 continues to turn in the direction of arrow 45, the coil spring or coil springs 38 of the second set of such springs in the damper 13 undergo additional compression while the flywheel 3 turns through an additional angle K, and such additional compression of the second set of coil springs is terminated when the distancing elements 37 strike the respective end portions of surfaces bounding the corresponding arcuate slots 34b in the input element 34 of the damper 13. The magnitude of torque which is transmitted by the damper 13 at such time is shown at 49 in the right-hand portion of FIG. 3.

If the direction of rotation of the flywheel 3 relative to the flywheel 4 is thereupon reversed (from the direction of the arrow 45 to the direction of arrow 44), the coil springs 38 of the damper 13 dissipate energy while the flywheel 3 turns through an angle L at which time the parts of the damper 13 reassume their starting or neutral positions (indicated by the reference character 50). Such neutral positions are shifted from the neutral positions denoted by the character 48 of FIG. 3 by the angle I, i.e., an angle corresponding to that which is covered by the flywheel 3 in the direction of arrow 45 while the components 25 and 29 of the slip clutch 14 move relative to one another. The components 25, 29 of the slip clutch 14 again begin to move relative to each other at the point 51 in the diagram of FIG. 3.

As can be seen in FIG. 3, the torque 47 (when the angular movement of the flywheel 3 relative to the flywheel 4 in the direction of arrow 44 is terminated by the distancing elements 37 and the surfaces bounding the respective slots 34b) exceeds the torque 49 which is transmitted by the flywheel 3 when the latter completes its angular movement relative to the flywheel 4 in the direction of arrow 45. In the illustrated embodiment, the torque 46 at which the clutch 14 begins to slip equals or approximates 20% of the maximum torque 47 which the damper 13 can transmit in the direction of arrow 44.

FIG. 3 further shows that the angle I (during which the components 25, 29 of the slip clutch 14 turn relative to each other) exceeds the angle F or L, i.e., the angle through which the input and output components 34 and 35, 36 of the damper 13 can turn relative to each other in the directions of arrows 44 and 45, respectively. In the embodiment of FIGS. 1 and 2, the angle L is smaller than the angle F, i.e., the angle through which the flywheel 3 turns relative to the flywheel 4 in the direction of arrow 44 while the components 34 and 35, 36 of the damper 13 turn relative to each other is greater than the angle which is covered by the flywheel 3 in the direction of arrow 45 while the components 34 and 35, 36 of the damper 13 turn relative to each other.

FIG. 3 does not show the frictional hysteresis which is caused by the friction generating devices 39 and 40 of the damper 13. The moments which are generated by the devices 39 and 40 are superimposed upon the moments which are generated by the coil springs 38 of the damper 13 in those regions (i.e., during movement of the flywheel 3 relative to the flywheel 4 through those angles) in which the devices 39 and 40 are operative.

The coil springs 52 of FIG. 2 are optional Such springs need not necessarily be mounted on the teeth 29a, 29b of the output component 29 of the slip clutch 14. For example, the springs 52 can be mounted on the teeth 27 or one thereof can be mounted on the tooth 27 while the other spring 52 is mounted on the corresponding tooth 29a or 29b. The purpose of the springs 52 is to prevent the teeth 27, 29a or 27, 29b from striking against each other with a pronounced force. The effect of the springs 52 is not shown in the diagram of FIG. 3. The resistance which the springs 52 offer to certain stages of further rotation of the components 25 and 29 relative to each other is superimposed upon the slip torque of the clutch 14.

An advantage of the assembly 1 is that its constituents can be put together or taken apart in a simple and time saving manner. Thus, the flywheel 3 can be affixed to the crankshaft 5 by bolts 6 in a first step, and the thus assembled unit A is then connected with the preassembled unit B as well as with certain other parts by the fastener means 26. The flywheel 4 can be readily assembled with the damper 13, slip clutch 14 and friction clutch 7 preparatory to attachment to the flywheel 3 by fastener means 26. The clutch disc 9 is then already centered between the pressure plate 8 of the friction clutch 7 and the flywheel 4. The system 15 of bearings 16 and 17 can be mounted on the flywheel 3 before the latter is connected with the flywheel 4 by fastener means 26 Alternatively, the system 15 can be assembled with the flywheel 4 before the latter is attached to the flywheel 3.

It has been found that, by the simple expedient of conforming the slip clutch 14 to the vibration characteristics of the engine 105 (prime mover) and to the characteristics of the damper 13, such slip clutch can effectively prevent excessive vibrations or oscillations of the units A and B by destroying requisite amounts of surplus energy.

The characteristics (such as stiffness and/or the initial stress) of the coil springs 52 can be readily selected in such a way that these springs perform a highly desirable shock absorbing action when the tooth 27 of FIG. 2 approaches the tooth 29a or 29b. Such springs also prevent the tooth 27 from rebounding on impact against the tooth 29a or 29b, i.e., the springs 52 can be constructed and mounted to prevent direct contact between such teeth The slip clutch 14 can be used with particular advantage in motor vehicles wherein the space between the crankshaft 5 of the engine 105 and the input element 10 of the change-speed transmission 110 is at a premium. This is due to the fact that the components 25, 29, the friction generating elements 31, 31a occupy very little room, as considered in the axial direction of the flywheels 3 and 4.

As explained in connection with FIG. 3, the magnitude of nominal torque which the engine 105 transmits to the unit A can be less than the maximum torque (shown at 47) which can be transmitted by the damper 13. However, the maximum torque (46) which the slip clutch 14 can transmit is preferably a relatively small fraction (between 8 and 60 percent, most preferably between 10 and 35 percent) of nominal torque which the engine 105 transmits to the unit A.

The maximum torque (46) which the slip clutch 14 transmits between the flywheels 3 and 4 is preferably a small fraction (between 5 and 50 percent and most preferably between 7 and 30 percent) of the maximum resistance (47) which the damper 13 can offer to rotation of the units A and B with reference to each other. Such design of the slip clutch 14 ensures that the assembly 1 can be constructed with a view to ensure that only the damper 13 opposes rotation of the flywheel 3 relative to the flywheel 4 (or vice versa) in a clockwise or counterclockwise direction from a neutral position before the slip clutch becomes operative (as at C during rotation in the direction of arrow 44 in FIG. 3). The components 25 and 29 of the clutch 14 begin to slip relative to each other when the torque of the already stressed (first and second sets of) coil springs 38 of the damper 13 suffices to overcome the resistance of the means 31, 31a which oppose rotation of the components 25 and 29 relative to each other. The coil springs 38 of the damper 13 undergo additional stressing (as at D and E in FIG. 3) when the components 25 and 29 can no longer turn relative to one another. As already explained in connection with FIG. 3, the situation is analogous when the flywheel 3 proceeds to turn in the direction of arrow 45 (after having completed its angular movement in the direction of arrow 44 with reference to the flywheel 4), i.e., the coil springs 38 of the damper 13 dissipate some energy before the components 25, 29 begin to turn relative to each other and, when the angular movement of the components 25, 29 relative to each other is completed, the springs 38 again dissipate energy (as at K).

In some instances, the slip torque of the clutch 14 can exceed the nominal torque of the engine 105.

It has been found that the slip clutch 14 will operate quite satisfactorily if the components 25 and 29 can turn relative to each other through angles of between 10 and 50 degrees, preferably between 15 and 35 degrees. The angle of maximum angular displacement of the components 25, 29 relative to each other can be between 60 and 110 percent (preferably between 80 and 90 percent of the maximum angle of angular displacement of the flywheels 3 and 4 relative to each other) Also, the maximum angle through which the components 25 and 29 can turn relative to each other preferably exceeds the maximum angle through which the flywheel 3 or 4 can turn clockwise or counterclockwise from its starting or neutral position. As already mentioned above, the angle through which the flywheel 3 or 4 can turn in the direction of arrow 44 (when the engine 105 drives the input element 10 of the change-speed transmission 110) preferably exceeds the angle through which the flywheel 3 or 4 can turn in the direction of arrow 45 (coasting). The slip clutch can more readily conform its operation to the vibration characteristics of the engine 105 (i.e., of the prime mover) if at least a portion (52) of the opposing means (31, 31a, 52) of the slip clutch is designed to start to oppose rotation of the units A and B relative to each other after the flywheel 3 or 4 already completes a certain stage of its angular movement from the starting or neutral position. As also mentioned above, the slip clutch is preferably a load-dependent clutch which comprises means (FIGS 4-5) for offering frictional resistance or means (52) for storing energy only after the flywheel 3 or 4 has already completed a certain angular movement from the starting position.

Figure 4:
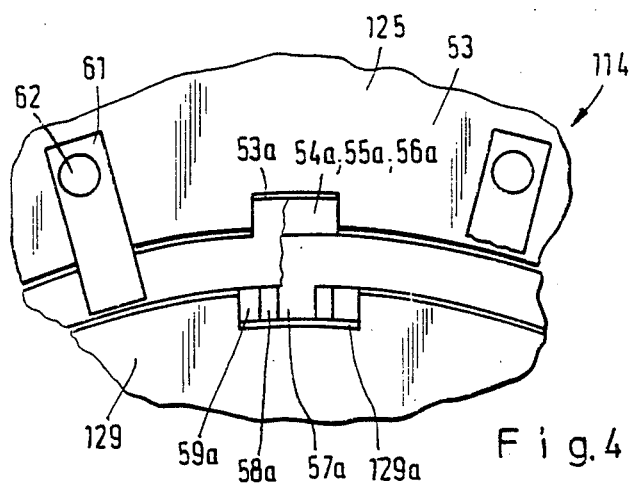
FIG. 4 is a fragmentary elevational view of a second slip clutch.
Figure 5:
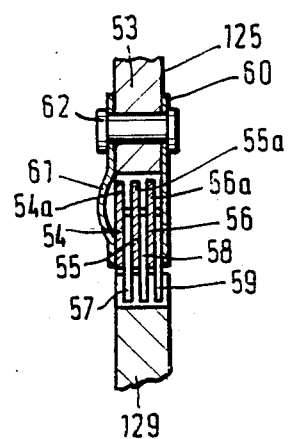
FIG. 5 is a sectional view as seen in the direction of arrows from the line V—V of FIG. 4.

FIGS. 4 and 5 illustrate a portion of a modified torsion damping assembly wherein the components 125 and 129 of the slip clutch 114 (which actually constitutes a set of several coaxial slip clutches) cooperate in a different way. The input component 125 of the clutch 114 comprises a plate-like carrier 53 which axially movably supports several disc-shaped friction generating elements in the form of laminations of lamellae 54, 55 and 56. The radially outermost portions of the laminations 54, 55 and 56 respectively carry radially extending teeth 54a, 55a and 56a received in sockets or cutouts 53a provided in the inner edge face of the plate-like carrier 53 so as to prevent rotation of the laminations 54-56 with reference to the input component 125.

The output component 129 of the slip clutch 114 also carries a set of axially shiftable laminations 57, 58, 59 which alternate with the laminations 54, 55, and 56, as considered in the axial direction of the slip clutch 114. The radially innermost portions of the laminations 57, 58 and 59 are respectively formed with profiled portions here shown as teeth 57a, 58a, 59a which are adjacent the central openings of the respective laminations and extend into complementary profiled portions including sockets or cutouts 129a in the peripheral surface of the component 129.

The carrier 53 of the input component 125 further supports an annular washer-like stop 60 which is disposed at one side of the clutch 114 (adjacent to the laminations 56 and 59). The other side of the carrier 53 supports a group of radially extending leaf springs 61 which are secured to the carrier 53 by rivets 62 and whose radially innermost portions bear upon the adjacent side of the lamination 54 so that the entire package of alternating laminations 54, 57, 55, 58, 56, 59 is urged axially against the stop 60 and the neighboring laminations are urged against each other. The rivets 62 preferably constitute the means for securing the stop 60 to the carrier 53 of the input component 125. The laminations 54 to 59 cooperate with each other, with the leaf springs 61 and with the stop 60 to oppose angular movements of the components 125 and 129 of the slip clutch 114 relative to each other.

As can be seen in FIG. 4, the width of the teeth 57a, 58a, 59a on the respective laminations 57, 58, 59 (as considered in the circumferential direction of the components 125 and 129) is not uniform. Thus, each of the laminations 57, 58, 59 can turn with reference to the component 129 to a different extent. This ensures that the friction generating means 54–61 between the components 125 and 129 of the slip clutch 114 operate in several successive steps or stages. In other words, the moment of friction between the components 125 and 129 can vary in response to progressive increase of the angle through which the components 125 and 129 are moved angularly relative to each other.

FIG. 5 shows that the laminations 54 to 56 of the input component 125 are in direct frictional engagement with the laminations 57, 58 and 59. However, it is equally possible to employ in the slip clutch 114 one or more organic or inorganic friction rings which are interposed between certain laminations or between all of the neighboring laminations and/or between the laminations 59 and the stop 60 and/or between the lamination 54 and the leaf springs 61 to thereby influence the friction between the components 125 and 129. In this manner, the slip clutch 114 can be caused to more accurately meet the specifications in a particular type of torsion damping assembly.

The multi-stage or composite slip clutch 114 of FIGS. 4 and 5 is especially suited to conform to the vibration characteristics of the engine and to the characteristics of the associated damper. As explained above, the resistance which the clutch 114 offers to rotation of the two units relative to each other increases with increasing angular displacement of the components 125, 129 relative to each other.

Figure 6:
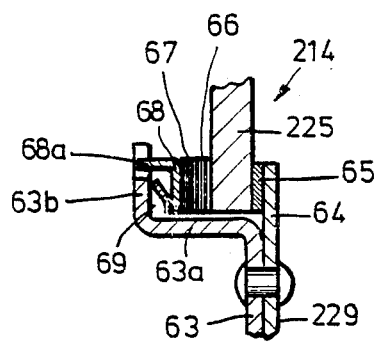
FIG. 6 is a fragmentary sectional view similar to that of FIG. 1 or 5 but showing a portion of a third slip clutch.
Figure 7:
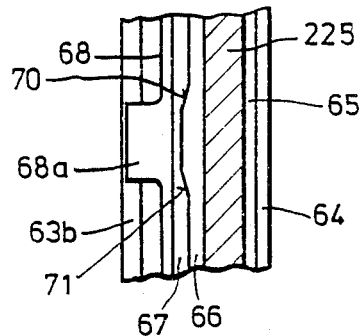
FIG. 7 is a sectional view substantially as seen in the direction of arrows from the line VII—VII of FIG. 6.

FIGS. 6 and 7 illustrate a third slip clutch 214 with an input component 225 and an output component 229. The latter comprises a disc-shaped member 64 and a profiled member 63 which is made of sheet metal and is secured to the disc-shaped member 64 by rivets 163. The profiled member 63 has a substantially Z-shaped cross-sectional outline and its radially outermost portion 63b is integral with an axially extending annular portion 63a. The latter forms with the disc-shaped member 64 a trough for a friction washer 65 which is adjacent to the inner side of the member 64 and is remote from the radially extending portion 63b. The left-hand side of the washer 65, as viewed in FIG. 6, is in contact with the respective side of the input component 125. The space between the input component 125 and the portion 63b of the profiled member 63 of the output component 129 accommodates a friction washer 66 which is non-rotatably affixed to the component 125 as well as a washer 67 and a friction generating element 68 having prongs 68a extending in the axial direction of the slip clutch 214 and into the adjacent cutouts 63b' of the portion 63b. A diaphragm spring 69 reacts against the inner side of the portion 63b and bears against the friction generating element 68. Thus, the diaphragm spring 69 urges the part 68 against the part 67 which urges the part 66 and the component 225 against the part 65 so that the latter is urged against the disc-shaped member 64 of the output component 229. The arms or prongs 68a of the friction generating element 68 hold the latter against rotation with reference to the profiled member 63, i.e., with reference to the output component 229.

As can be seen in FIG. 7, the washers 66 and 67 are formed with axially extending complementary male and female profiles or detent portions. Such detent portions form cam and follower means having ramps 70 and 71. Thus, and starting from the angular positions of the components 225, 229 which are shown in FIG. 7, rotation of such components relative to one another in either direction from the neutral positions of FIG. 7 entails an axial movement of the washers 66, 67 away from each other to thereby change the bias of the diaphragm spring 69 in dependency on the angular positions of the components 225, 229 with reference to each other. This, in turn, entails a change in the slip torque of the clutch 214. The slip torque increases as the stress upon the diaphragm spring 69 increases. In the embodiment of FIGS. 6 and 7, the slip torque increases regardless of whether the washer 67 is rotated in a clockwise or in a counterclockwise direction, as viewed in FIG. 7, because the cam and follower means which is defined by the washers 66, 67 is shown in the neutral or median position. The slope of the ramp 70 can be different from that of the ramp 71 so that the slip torque increases at a first rate then the washer 66 or 67 is rotated in first direction and at a different second rate when the washer 66 or 67 is rotated in a second direction counter to the first direction. The planes of the ramps 70, 71 are inclined with reference to a plane which is normal to the common axis of the flywheels (not shown in FIGS. 6 and 7).

Without further analysis, the foregoing will so fully reveal the gist of the present invention that others can,.by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. An assembly for damping vibrations in a torque transmitting arrangement between an engine and an input part of a transmission, particularly for damping vibrations which originate in the engine, comprising a first flywheel connectable to the engine and a second flywheel connectable to an input part of the transmission, said flywheels being rotatable relative to each other; at least one damper means including energy storing means operative to oppose rotation of said flywheels relative to each other; and a plurality of torque-transmitting slip clutches operating between said flywheels and arranged to oppose rotation of the flywheels relative to each other in a predetermined sequence.

2. The assembly of claim 1, wherein said slip clutches have different moments of friction.

3. The assembly of claim 1, wherein said slip clutches are coaxial with and are adjacent each other.

4. The assembly of claim 1, wherein said slip clutches are disposed radially outwardly of said energy storing means.

5. The assembly of claim 1, wherein each of said slip clutches has an input member and an output member and at least one of said members includes an annular region, and further comprising a form-locking connection between each annular region and one of said flywheels, at least one of said connections providing a predetermined angular play, said input and output members alternating in the axial direction of said flywheels and said connections comprising a component form-lockingly connected with one of said input and output members and said energy storing means being arranged to transmit torque between said component and one of said flywheels.

6. The assembly of claim 5, wherein at least one of said annular regions has at least one profiled portion in motion transmitting engagement with said component.

7. The assembly of claim 6, wherein said component has a profiled portion which is engageable with the profiled portion of said at least one annular region so that the profiled portions have predetermined freedom of movement relative to each other.

8. The assembly of claim 7, wherein the profiled portion of said component includes a socket in said component.

9. The assembly of claim 6, wherein said at least one annular region has a central opening and said at least one profiled portion is adjacent said opening.

10. The assembly of claim 1, wherein each of said slip clutches includes an input member and an output member and one of said members includes a lamination, said laminations having profiled portions of different lengths in the circumferential direction of said flywheels.

* * * * *